(No Model.) 5 Sheets—Sheet 2.
A. F. MADDEN.
MACHINE FOR MAKING GRIDS FOR SECONDARY BATTERY PLATES.
No. 570,224. Patented Oct. 27, 1896.
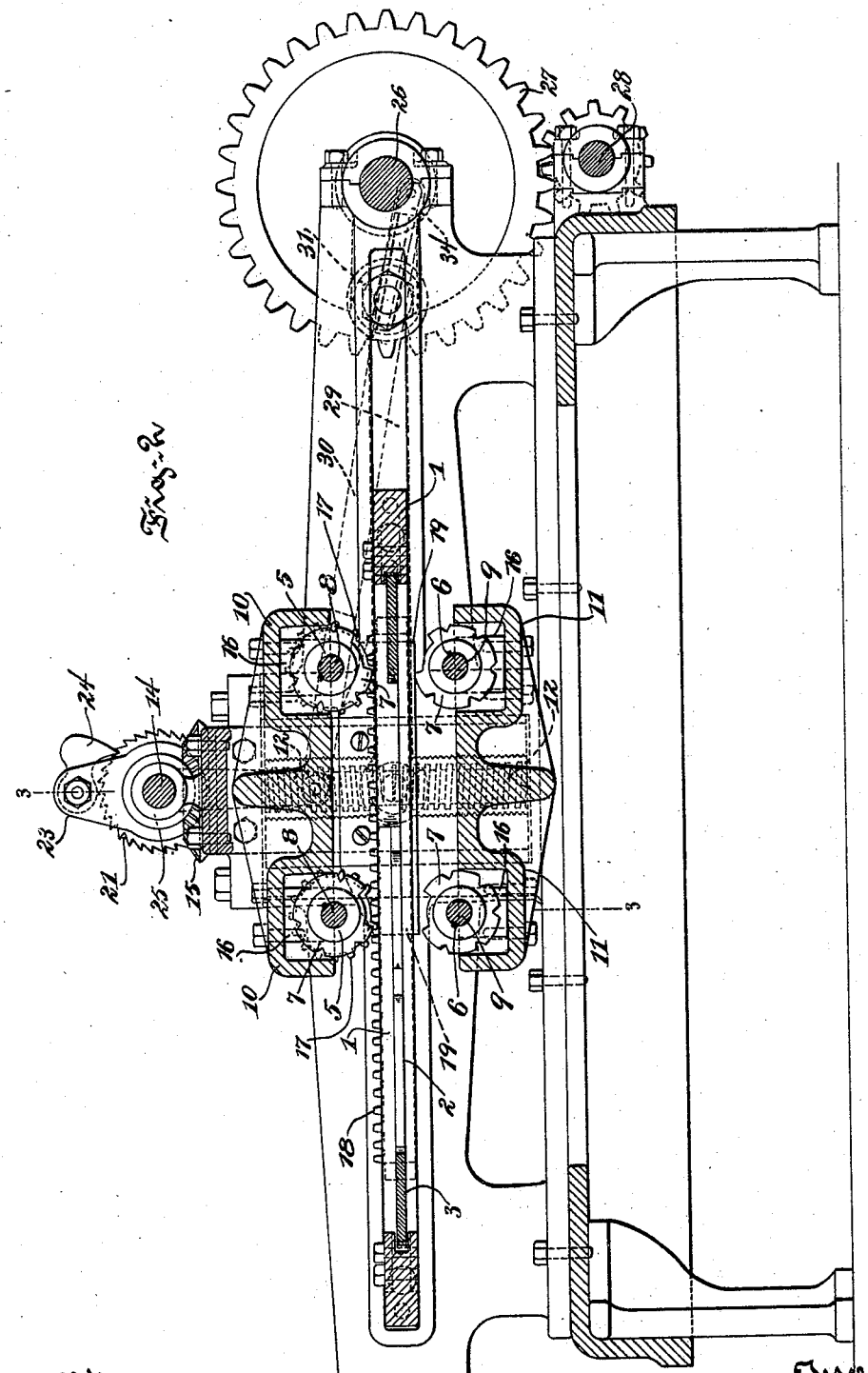

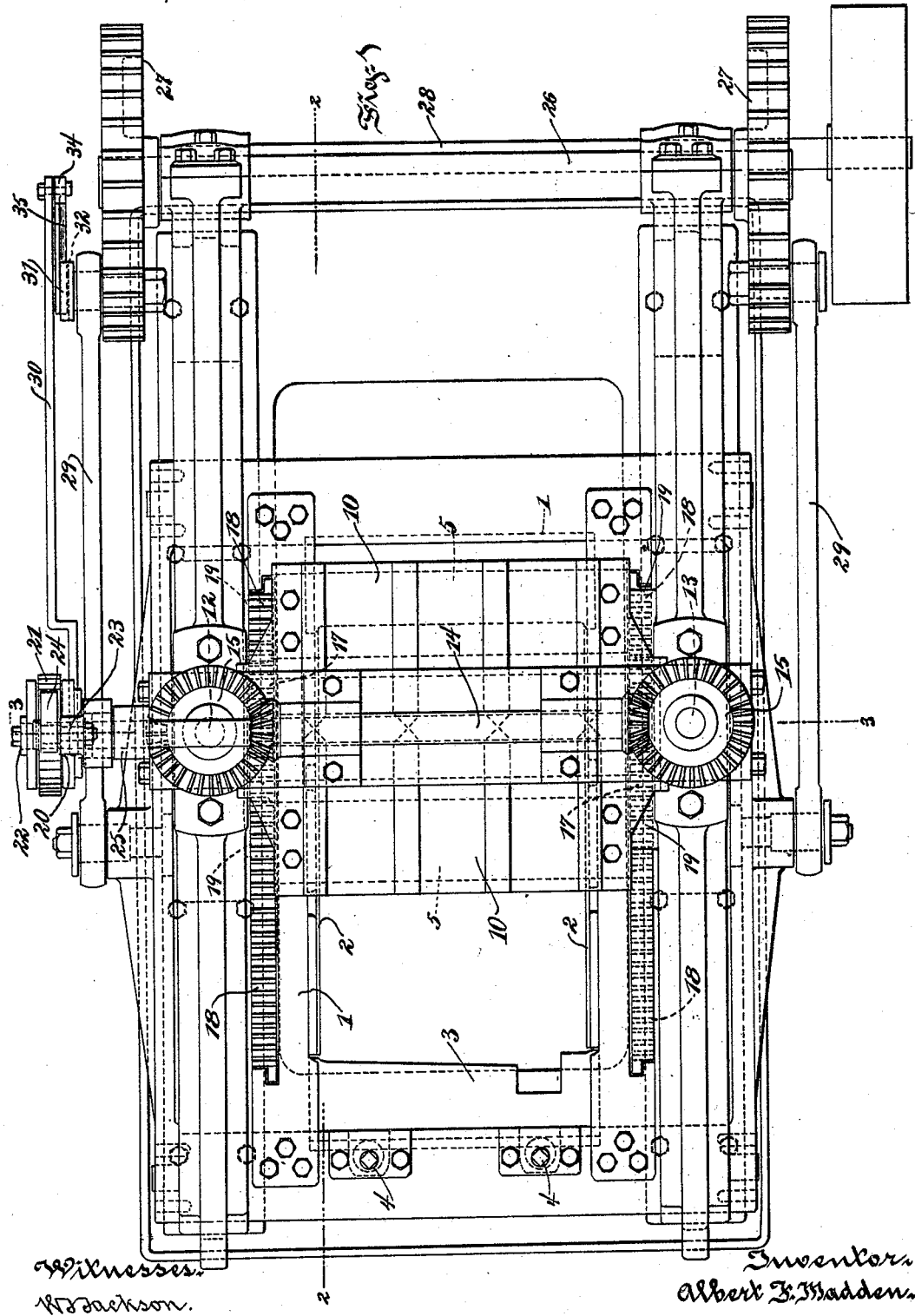

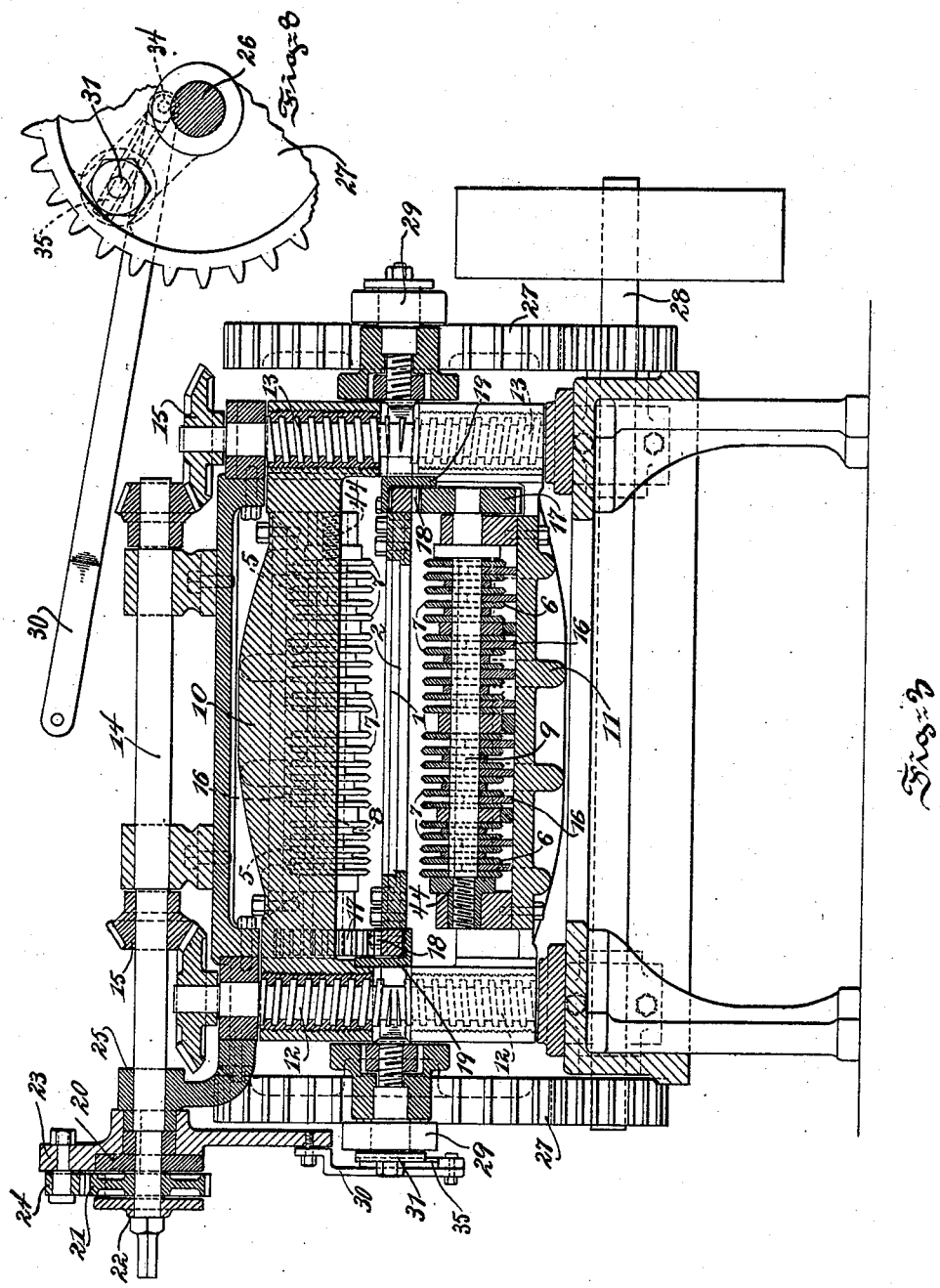

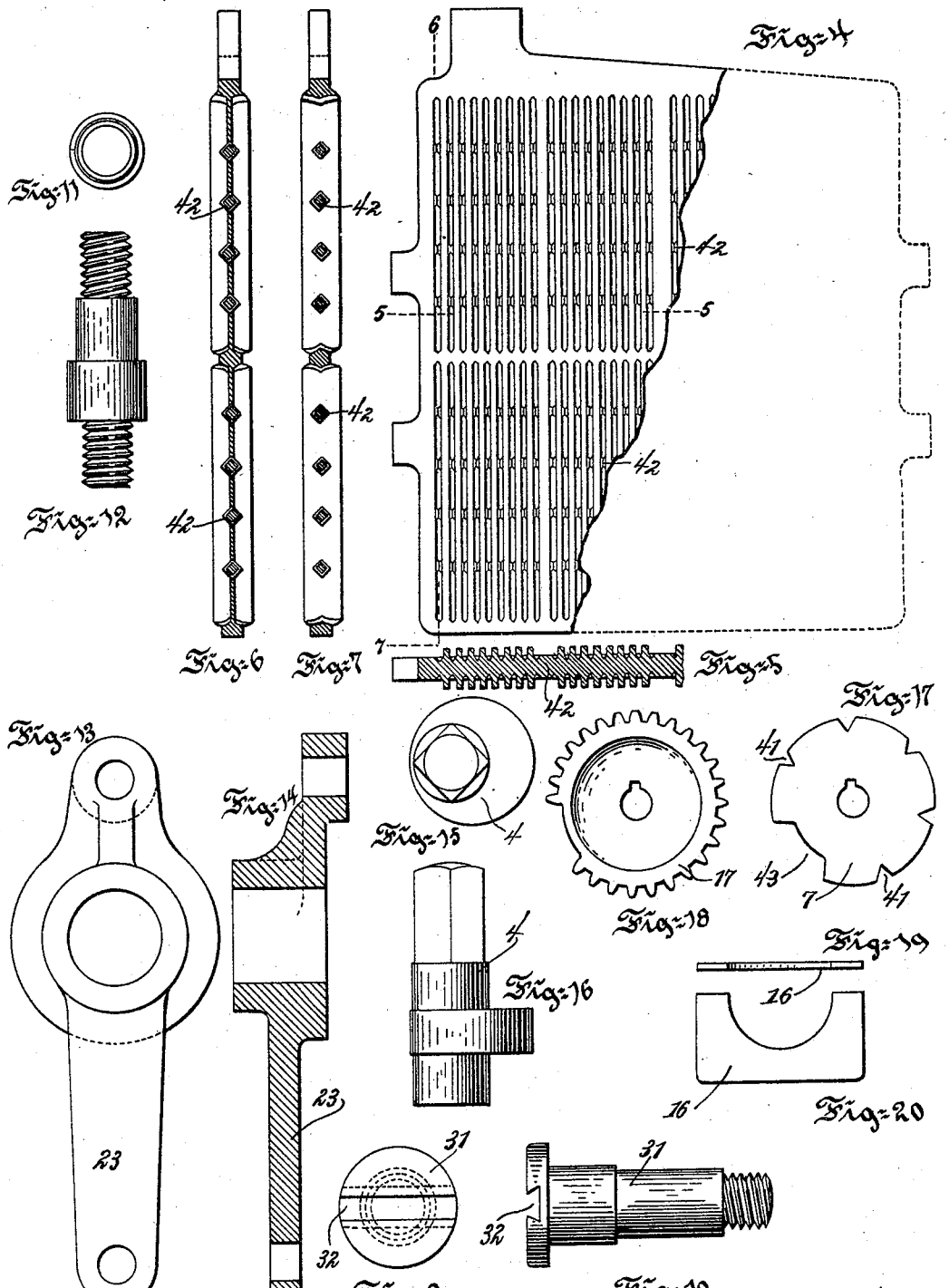

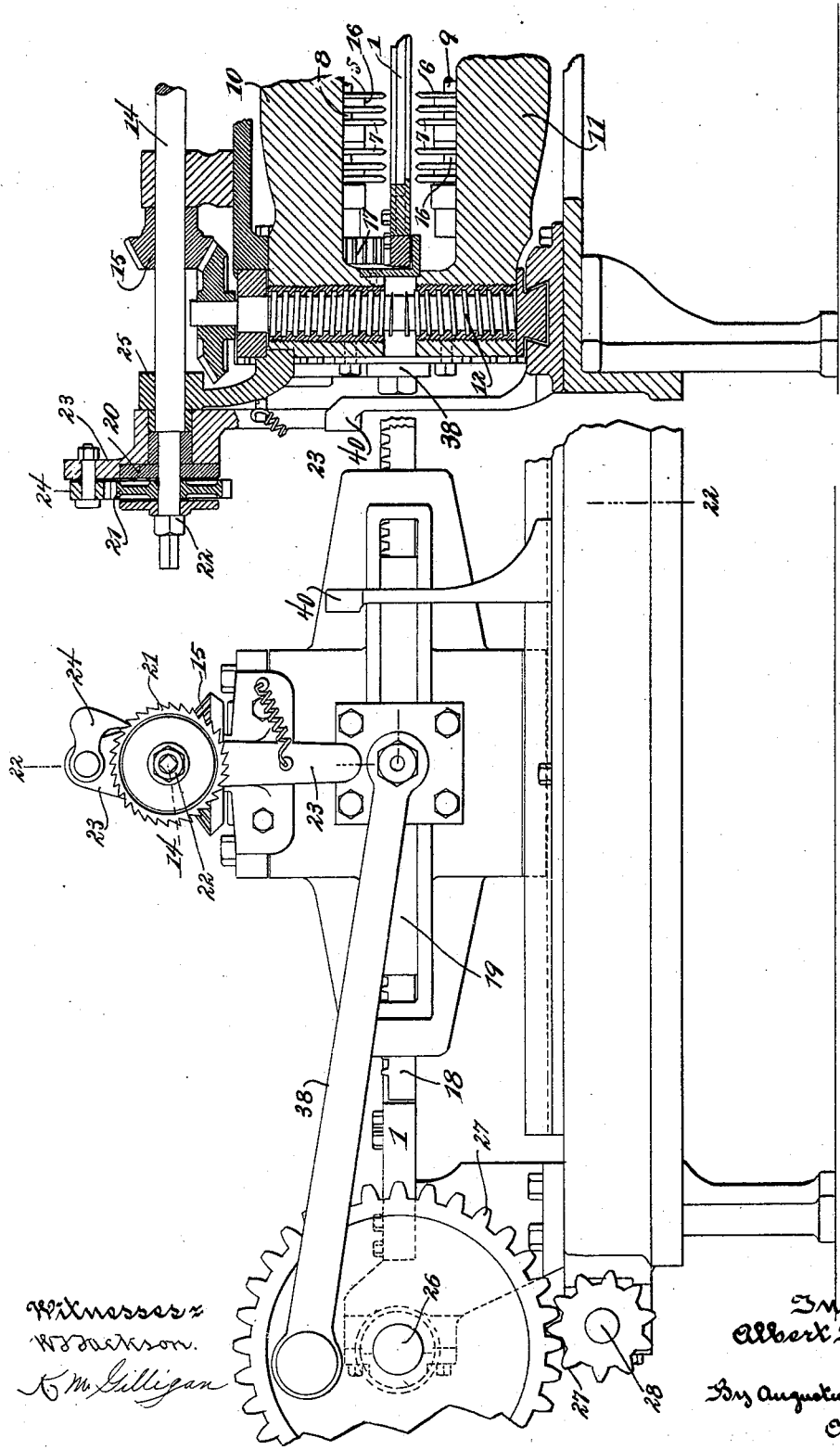

UNITED STATES PATENT OFFICE.

ALBERT F. MADDEN, OF NEWARK, NEW JERSEY, ASSIGNOR TO THE ELECTRIC STORAGE BATTERY COMPANY, OF GLOUCESTER CITY, NEW JERSEY.

MACHINE FOR MAKING GRIDS FOR SECONDARY-BATTERY PLATES.

SPECIFICATION forming part of Letters Patent No. 570,224, dated October 27, 1896.

Application filed January 11, 1896. Serial No. 575,106. (No model.)

*To all whom it may concern:*

Be it known that I, ALBERT F. MADDEN, a citizen of the United States, residing at Newark, New Jersey, have invented a certain new and useful Machine for Making Grids for Secondary-Battery Plates, of which the following is a specification.

The principal objects of my present invention are, first, to provide a comparatively simple and effective machine for expeditiously and comparatively inexpensively transforming, reducing, and preparing the lead of blanks to a different state well suited to fulfil storage-battery requirements while shaping or manufacturing them, and, second, to so construct, combine, and arrange the various parts of the machine as that the same is adapted for the production of grids of various sizes and kinds; and to these ends my invention consists of the improvements hereinafter described and claimed.

The mode of operation of a machine embodying features of my invention is such that portions of a lead blank held against edgewise expansion are gradually displaced, for example, by repeatedly embedding devices into it, thereby increasing its density and squeezing up face-hardened bars, ribs, or the like above the original face of the plate. By this function of the machine a cast-lead blank is converted into wrought lead and an ordinary rolled-lead blank is improved, and in each case the lead is transformed or reduced to a state well adapted for the production of excellent results in storage batteries.

The nature, characteristic features, and scope of my invention will be more fully understood from the following description, taken in connection with the accompanying drawings, forming part hereof, and in which—

Figure 1 is a top or plan view of a machine embodying features of my invention. Fig. 2 is a sectional elevation taken on the line 2 2 of Fig. 1. Fig. 3 is a similar view taken on the line 3 3 of Figs. 1 and 2. Fig. 4 is a view of a portion of a grid, illustrating the character of work done by the machine. Fig. 5 is a sectional view taken on the line 5 5 of Fig. 4. Figs. 6 and 7 are sectional views taken in the direction indicated by the line 6 7 in Fig. 4 and showing, respectively, grooves or channels extending partially and wholly through the grid. Fig. 8 is a side view of the link and of some of its accessories for operating the pawl-and-ratchet feed. Figs. 9 and 10 are end and side views of the pin or stud for the side link. Figs. 11, 12, 13, and 14 are detail views of portions of the ratchet-feed. Figs. 15 and 16 are views of one of the grid-eccentric-clamping devices. Fig. 17 is a view of one of the cutters or rotary punches. Fig. 18 is a view of one of the gears for driving the cutter or punch shaft. Figs. 19 and 20 are views illustrating one of the bearing-pieces for the cutter or punch shaft. Fig. 21 is a side view of a portion of a machine embodying a modification of my invention, and Fig. 22 is a sectional view taken on the line 22 22 of Fig. 21.

Referring to the drawings, I will describe a machine embodying features of my invention and well adapted for use in practicing the same.

In the drawings, 1 is a holder for supporting a blank. As shown in the drawings, this holder is of generally rectangular form and is or may be provided at its sides with lips 2, onto which the edges of the blank are laid, and with a movable jaw 3, adapted to clamp the blank between it and the opposite end of the support, for example, through the intervention of eccentrics 4, Figs. 15 and 16, carried by suitable arbors adapted for the application of a key, wrench, or other tool. However, the shape of the holder and the type of the clamping devices are not essentials of my invention. It will thus be seen that blanks of somewhat different sizes may be applied to the holder 1 and that their respective faces are exposed.

5 and 6 are grooved rolls disposed on each side; in other words, above and below the holder 1. As shown in the drawings, these grooved rolls comprise rotary punches or disks 7, Fig. 17, splined and alternated with washers or distance-pieces on shafts 8 and 9. Obviously these rolls may be made integral or built up of sections.

44 is a nut for clamping the washers and punches or disks on their shaft. The object of this construction is to afford means whereby the parts 7 and washers or distance-pieces may be readily removed from and replaced on their shaft and whereby they may be associated with washers of different thicknesses in order to increase or diminish the distance by which they are separated for the purpose of changing the type or style of the resultant product of the machine. These grooved rolls are or may be carried by suitable carriers, as 10 and 11, to which they are revolubly connected.

In the drawings I have shown two grooved rolls above and two below the support 1, but the number is not important. The grooved rolls and the blank-support 1 are movable the one in respect to the other for the purpose of working over the respective faces of the blank. This result may be accomplished by reciprocating the support in respect to the grooved rolls, as shown in Figs. 1, 2, and 3, or by reciprocating the carriers 10 and 11, as shown in Figs. 21 and 22, as is hereinafter more fully described. The respective sets of cutters or grooved rolls are fed from opposite sides of the blank toward the center thereof, so as to gradually embed them into its respective faces. For this purpose use may be made of right and left handed screws 12 and 13, mounted so as to turn without endwise movement and adapted to engage nuts connected with the grooved rolls. In the present instance these nuts are formed in or applied to the carriers 10 and 11.

14 is a feed-shaft which when rotated imparts rotary motion to the screws 12 and 13 through the intervention of bevel-gearing 15.

It is obvious that when the cutters or ribs of the grooved rolls are embedded, pressed, or fed into the respective faces of the blank there is considerable transverse strain upon their shafts. This strain, however, is or may be taken up by bearing-pieces 16, Figs. 19 and 20, which are placed between the respective cutters and permitted to rest upon the carriers 10 and 11. Rotary motion, first in one direction and then in the other, is or may be imparted to the cutters or grooved rolls. For this purpose the cutter-shafts may be provided with pinions 17, meshing with racks 18. These racks 18 are held against endwise movement by fitting them in slots in the blank-holder 1, and are held in proper engagement with their pinions 17 by feet 19, attached to the carrier and supporting the back of the racks, so that when the carrier is fed upward or downward in the manner above described the feet keep the teeth of the rack in proper engagement with the pinions and at the same time shift the rack in the slot, but not far enough to permit its ends to pass out of engagement with the blank-support 1. The feed-shaft 14 may be provided with a squared end for the reception of a crank or key by means of which it is possible to rotate it manually, and it is also provided with a fast or keyed friction-wheel 20, against which a ratchet-wheel 21 is caused to bear by means of a nut and washer 22.

23 is a rocker-arm provided with a pawl 24, adapted to drive the ratchet-wheel 21. As shown in the drawings, this rocker-arm has a bearing upon a projection formed on a bracket 25, carried at the side of the frame of the machine. When the rocker-arm is rocked, the pawl 24 drives the ratchet-wheel 21, which is loose on the feed-shaft. However, this ratchet-wheel frictionally engages with the friction-wheel 20, and thus drives the feed-shaft, but in the case of accident the ratchet-wheel would slip in respect to the friction-wheel and thus prevent breakage or damage.

26 is a driving-shaft suitably rotated, for example, through the intervention of spur-wheels 27 and a counter-shaft 28, to which power is applied.

Referring to Figs. 1, 2, and 3, the blank-holder 1 is adapted to slide endwise in suitable ways formed in or carried by the side pieces of the machine and is reciprocated back and forth by connecting-rods 29, connected with it and with crank-pins actuated by the shaft 26. The requisite rocking motion is imparted to the rocker-arm 23 by means of a link 30, one end of which is pivoted to it. The other end of this link is pivoted to the crank-pin 31. As shown in the drawings, the head of this crank-pin is provided with a dovetail groove 32, Figs. 9 and 10.

34, Fig. 8, is an arm to which the link 30 is pivoted. This arm 34 is provided with a dovetail block 35, tightly fitted to the corresponding groove 32. By this construction it is possible to loosen the crank-pin 31, and then turn the arm 34 so as to throw its point of pivotal connection with the link 30 toward or away from the center of the wheel 27 for the purpose of increasing or diminishing the throw of the link 30, whereby the feed of the cutters or grooved rolls is increased or diminished because the throw of the link determines the number of teeth engaged by the pawl 24 at each stroke.

In Figs. 21 and 22 the blank-holder 1 is fixed and the carriers 10 and 11 and their framing are adapted to be reciprocated in ways formed at the sides of the machine and are connected with connecting-rods 38. In this instance the rocker-arm 23 is of course reciprocated bodily with the carrier and may be rocked in one direction by colliding with a fixed projection, as 40.

The mode of operation of the above-described machine may be explained as follows: A blank, for example, of cast-lead, having the required contour is mounted in the holder 1 in the manner above described. The grooved rolls 5 and 6 and blank are then reciprocated the one in respect to the other, while at the same time the rolls are fed so as to embed their projecting portions, ribs, cutters, or punches into the respective faces of the blank. The rolls are also turned first in one direction and then in the other, so that their peripheries travel at substantially the same linear velocity as the blank and back and forth in the same grooves, which constantly become deeper. The result of the foregoing operations is to press the projecting portions of the rolls into the substance of the blank and to gradually force the displaced material into the spaces in the grooved rolls, whereby bars or the like are raised above the original face of the blank and whereby the blank is worked over, pressed, and manipulated in such manner that if of cast-lead it is converted into rolled or wrought lead, or if of ordinary rolled lead it is much improved. The blank may be simply grooved on its opposite faces, as shown in Fig. 6, or it may be slotted clear through, as indicated in Fig. 7, by increasing or diminishing the depth to which the projections on the grooved rolls 5 and 6 are fed into the respective faces of the blank. By notching the ribs, projections, or cutters of the grooved rolls 5 and 6, as shown at 41, it is possible to provide the plate with stiffening-pieces 42, because the metal of the blank enters these notches 41, and is therefore not pressed aside. The rolls have portions of their projecting parts, ribs, or cutters cut away, as shown at 43. This portion 43 corresponds with the end border of the plate and never comes into contact with the blank, its purpose being to facilitate the feeding of the cutters, and it may be remarked that some of the teeth are omitted from the pinions 17 for analogous reasons.

It will be obvious to those skilled in the art to which my invention appertains that modifications may be made in details without departing from the spirit thereof. Hence I do not limit myself to the precise construction and arrangement of parts hereinabove set forth, and illustrated in the accompanying drawings; but,

Having thus described the nature and objects of my invention, what I claim as new, and desire to secure by Letters Patent, is—

1. A machine for making secondary-battery plates comprising the combination of, a holder for confining and supporting a blank at or near its edges, revoluble cutters disposed respectively on opposite sides of the holder, and means for shifting one of said elements or parts in respect to the other and for embedding the cutters into the respective faces of the blank to groove and roll it, substantially as described.

2. A machine for making secondary-battery grids, comprising the combination of, a blank-holder, cutters on each side of the holder, means for reciprocating one of said parts in respect to the other, devices for rotating the cutters, and mechanism for feeding the sets of cutters toward each other, substantially as described.

3. A machine for making secondary-battery grids, comprising the combination of, a blank-holder provided with racks, cutters on each side of the holder, means for reciprocating one of said parts in respect to the other, pinions meshing with said racks and driving the cutters, and mechanism for feeding the cutters toward the holder, substantially as described.

4. In a machine for making secondary-battery grids, the combination of, a blank-holder, a set of revoluble separated cutters and a cutter-carrier on each side of the holder, means for reciprocating one of said elements or parts in respect to the other, devices for feeding said sets of cutters and cutter-carriers toward each other, racks carried by and afforded a range of motion transversely of said holder, pinions for driving said cutters, and feet applied to said carriers and supporting said racks, substantially as described.

5. A machine for making secondary-battery grids comprising the combination of, a grid-holder, a cutter-carrier on each side of the holder, means for feeding said carriers toward each other, cutter-shafts carried by said carriers and provided with separated cutters, and bearing-pieces interposed between the cutters and detachably fitted to the carriers, substantially as described.

6. In a machine for making secondary-battery grids the combination of, a blank-holder, a cutter-carrier on each side thereof, means for shifting one of said elements or parts in respect to the other and for feeding the cutter-carriers toward each other, cutter-shafts carried by said carriers, and cutters with interposed washers splined and detachably clamped on said shafts, substantially as described.

7. In a machine for making secondary-battery grids the combination of, a holder for confining and supporting a blank, a cutter-carrier on each side thereof, means for shifting one of said elements or parts in respect to the other and for feeding the cutter-carriers toward each other, separated cutters having portions of their peripheries removed, and means for rotating said cutters, substantially as described.

8. In a machine for making secondary-battery grids the combination of, a blank-holder, a frame supporting a cutter-carrier on each side thereof, means for shifting one of said elements or parts in respect to the other, right and left handed screws mounted in said frame and engaging nuts on said carriers, a feed-shaft and gearing for actuating said screws, positively-driven pawl-and-ratchet connections substantially as described, and a friction-wheel fast on said shaft and actuated by said pawl-and-ratchet connections, for the purposes set forth.

9. In a machine for making secondary-battery grids the combination of, a blank-holder, a frame supporting a cutter-carrier on each side thereof, connecting-rods and crank-pins for reciprocating said holder, a feed-shaft, gearing and screws for feeding the cutter-carriers, pawl-and-ratchet connections for actuating said feed-shaft, a link having one end connected with said pawl-and-ratchet connections, and an arm pivotally connected with the other end of said link and secured to one of said crank-pins, substantially as described.

10. A machine for making secondary-battery grids comprising the combination of, a blank-holder, a frame supporting cutter-carriers and cutters on opposite sides of the holder, cranks and connecting-rods for reciprocating one of said parts in respect to the other, racks and pinions applied respectively to the holder and cutters, right and left hand screws and their feed-shaft, and pawl-and-ratchet connections for feeding the cutter-carriers, substantially as described.

In testimony whereof I have hereunto signed my name.

ALBERT F. MADDEN.

In presence of—
ROBERT McA. LLOYD,
W. P. BELKNAP.